United States Patent [19]
Wang

[11] Patent Number: 5,784,953
[45] Date of Patent: Jul. 28, 1998

[54] EGG SEPARATOR

[75] Inventor: Nigel Wang, Taipei, Taiwan

[73] Assignee: The Pampered Chef, Ltd., Addison, Ill.

[21] Appl. No.: 615,590

[22] Filed: Mar. 12, 1996

[51] Int. Cl.$^6$ .................. A47J 19/02; A47J 43/14; A23N 1/00
[52] U.S. Cl. .................. 99/499; 99/497; D7/667
[58] Field of Search .................. 99/495, 496–500, 99/568, 567; D7/667; 30/325, 327

[56] References Cited

U.S. PATENT DOCUMENTS

| | | |
|---|---|---|
| D. 28,876 | 6/1898 | Macy . |
| D. 29,139 | 8/1898 | Pullman . |
| D. 136,251 | 8/1943 | Clark . |
| D. 138,398 | 8/1944 | Reynolds . |
| D. 218,634 | 9/1970 | Swett . |
| D. 307,527 | 5/1990 | DeCoster . |
| 648,598 | 5/1900 | Salomon . |
| 941,415 | 11/1909 | Heatherington et al. . |
| 1,262,420 | 4/1918 | Wicke . |
| 2,000,472 | 5/1935 | Muzzio .................. 99/499 |
| 2,018,162 | 10/1935 | Weldon . |
| 2,035,065 | 3/1936 | Gray . |
| 2,150,719 | 3/1939 | Milward .................. 99/499 |
| 2,187,488 | 1/1940 | Brueggeman .................. 99/499 |
| 2,212,502 | 8/1940 | Leahey . |
| 2,382,222 | 8/1945 | Havas .................. 99/499 |
| 2,382,737 | 8/1945 | Mink .................. 99/499 X |
| 2,430,156 | 11/1947 | Byers .................. 99/499 |
| 2,523,777 | 9/1950 | Polcar .................. 99/499 |
| 3,331,414 | 7/1967 | Dillon et al. .................. 99/499 |
| 3,656,525 | 4/1972 | Goodart . |
| 3,749,001 | 7/1973 | Swett . |
| 3,857,327 | 12/1974 | Popeil .................. 99/499 |
| 4,463,666 | 8/1984 | Papp .................. 99/497 |
| 4,554,866 | 11/1985 | Hampton .................. 99/497 X |
| 4,665,813 | 5/1987 | Maisonneuvre .................. 99/499 |
| 5,088,391 | 2/1992 | Ancona et al. .................. 99/499 |

*Primary Examiner*—Timothy F. Simone
*Attorney, Agent, or Firm*—Olson & Hierl, Ltd.

[57] ABSTRACT

An unitary egg separator is provided which includes a cup with a handle. The cup has a pair of symmetrically located elongated slots positioned adjacent to the bottom apex of the cup. The handle is transversely broadened and longitudinally relatively short, and has transversely spaced, downwardly extending ears on its opposite sides that cooperate with the cup for attaching the egg separator to the rim of a mixing bowl or the like. Also, the handle includes an upwardly extending flange adjacent to the cup, the flange having an edge that is adapted for cracking the shell of an egg.

17 Claims, 1 Drawing Sheet

U.S. Patent     Jul. 28, 1998     5,784,953
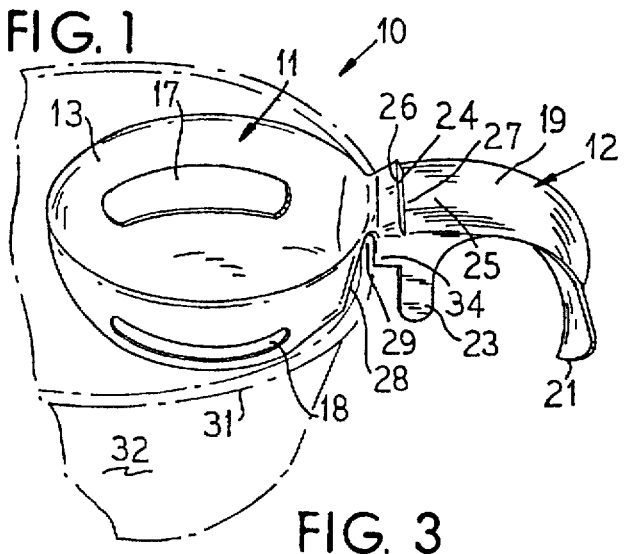
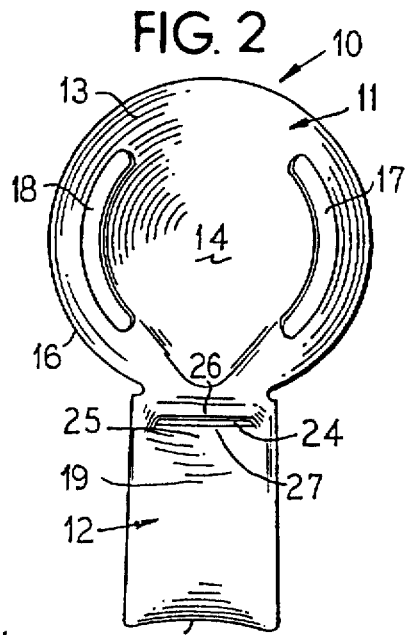
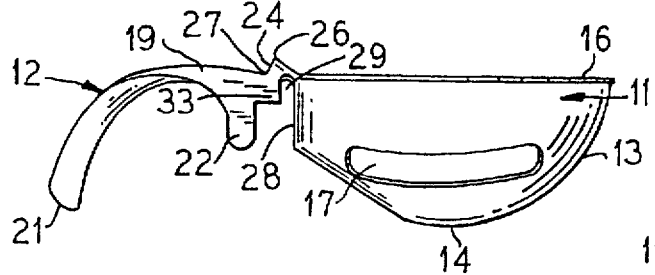
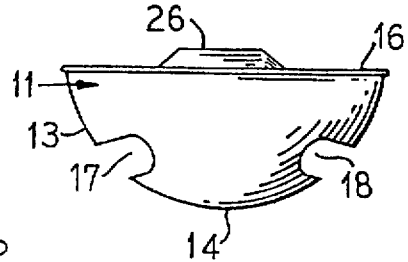
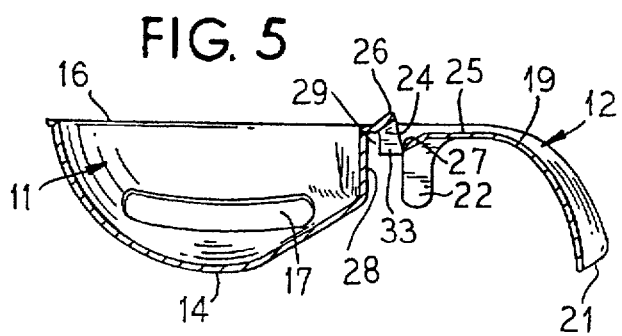
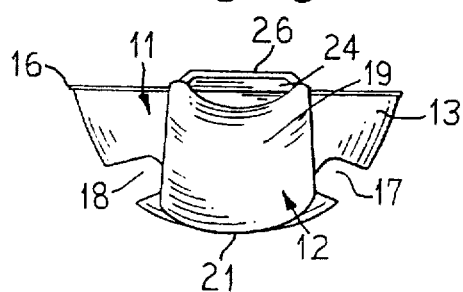
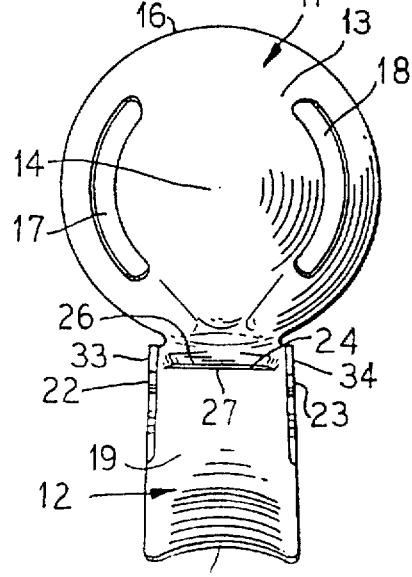

1
EGG SEPARATOR

FIELD OF THE INVENTION

The present invention relates to an improved egg separator.

BACKGROUND OF THE INVENTION

Apertured cup-type egg separators are well known in the art. After the contents of the egg are deposited in the cup, the egg white passes through the apertures in the cup while the yolk is retained in the cup.

Previous devices separated egg whites from the egg yolk, but were often inconvenient to use. For example, some egg separators required the user to hold the separator over a mixing bowl while the egg whites drained therefrom.

Other egg separators included two or more arms which extended outwardly in different directions from the cup. The arms were supposed to allow the device to be positioned over the top of a mixing bowl or the like by resting the arms on the rim of the bowl.

The arms could themselves cause problems. For example, the rim of the bowl often can not be used to crack an egg shell if the egg separator is large relative to the diameter of the bowl. Thus, an egg must sometimes be cracked adjacent to the mixing bowl which can result in egg white dripping onto the work area.

For another example, the force used to strike and crack an egg shell on the rim of the mixing bowl could cause the egg separator to be jolted relative to the mixing bowl rim so that the egg separator falls into the bowl.

Also, previous egg separators did not provide an egg shell cracking edge, or an easily accessible surface upon which is an egg shell cracking edge could be situated.

The present invention provides an improved egg separator which overcomes the foregoing problems with the prior art.

SUMMARY OF THE INVENTION

The present invention relates to an egg separator having an apertured cup and a coacting handle which provides for cracking an egg shell, for attachment to a mixing bowl, and for unobtrusive holding of the handle by a user.

The present invention provides a simple and effective apparatus for separating egg whites from egg yolk.

The apparatus includes means for cracking an egg shell and means for associating the apparatus with the edge of a vessel, such as a mixing bowl, measuring cup or the like.

The egg shell can be cracked while the apparatus is positioned on the edge of the vessel. The apparatus can be hand held without substantial interference with other functions or operations during use.

Preferably, the egg separator is formed of a single material which includes both the apertured cup and the coacting handle. A presently preferred material is a formed metal sheet, more preferably stainless steel or an aluminum alloy. However, a molded plastic material can also be used.

Conveniently and preferably, the cup has the configuration of a spherical segment that approaches (but does not reach) that of a hemisphere, and the cup apertures comprise a pair of symmetrically located elongated slots located in circumferentially spaced but adjacent relationship to the bottom apex of the cup.

Preferably, the handle is relatively short but relatively broad. The handle extends outwardly from a circumferential portion of the cup lip. Preferably, a transversely spaced, downturned ear is associated with each opposite handle side longitudinally adjacent to the cup. The ears cooperate with the cup to provide means for attaching the egg separator to the rim or edge of a vessel, such as a mixing bowl, measuring cup or the like.

Preferably, an upwardly extending flange is also associated with an upper medial surface portion of the handle adjacent to the cup, and this flange is adapted for cracking the shell of an egg.

The handle is preferably curved as the distance from the cup increases in a manner which not only facilitates hand holding of the egg separator, but also enhances the other functional features of this invention.

Other and further objects, aims, purposes, advantages, features, applications, embodiments, and the like for the present invention will be apparent from the present disclosure taken with the appended claims and the accompanying drawings.

BRIEF DESCRIPTION OF THE DRAWINGS

In the drawings:

FIG. 1 is a perspective view of one embodiment of the inventive egg separator shown in operative association with an upper edge portion of an illustrative mixing bowl (shown in phantom);

FIG. 2 is a top plan view of the egg separator of FIG. 1;

FIG. 3 is a side elevational view of the egg separator of FIG. 1;

FIG. 4 is an end elevational view of the egg separator of FIG. 1;

FIG. 5 is a longitudinal vertical sectional taken along the line V—V of FIG. 2;

FIG. 6 is a view similar to FIG. 4, but showing the opposite end of the egg separator; and FIG. 7 is a bottom plan view of the egg separator of FIG. 1.

DETAILED DESCRIPTION

Referring to the drawings, one embodiment 10 of the inventive egg separator is shown. The egg separator 10 is unitarily formed and comprises a cup 11 and a connected handle 12.

The cup 11 is adapted for separating an egg yolk from an egg white as those materials are deposited from a deshelled egg. The cup 11 is preferably configured as a spherical segment and has generally spherically curved sidewalls 13, a bottom apex 14, and a circular (or annular) upper lip 16 (preferably slightly outturned).

The cup 11 is apertured. As those skilled in the art will appreciate, various aperture arrangements can be employed. A present preference is to provide a pair of circumferentially extending slots 17 and 18 in the cup 11. The slots can be symmetrically positioned relative to each other and can be in circumferentially spaced relationship relative to bottom apex 14. The slots are also preferably (and as shown) arranged so that each end is equidistant from the approximate longitudinal center of the handle 12. The circumferential spacing of each slot 17 and 18 from bottom apex 14 is preferably chosen so that an egg yolk will rest in the bottom region of the cup 11 centrally over the bottom apex 14 between the slots 17 and 18.

The handle 12 is transversely broadened, extends longitudinally a relatively short distance, and extends laterally and outwardly from a circumferential portion 19 of lip 16 to a handle outer end 21.

The handle 12 has a pair of downwardly extending ears 22 and 23. Each ear 22 and 23 is transversely located on a different lateral side of the handle 12 in an opposed relationship. Also, each ear 22 and 23 is in an equally spaced, adjacent longitudinal (considered in relation to handle 12) relationship with respect to cup 11.

The handle 12 has a transversely extending generally straight slot 24 extending transversely across a medial region of the handle 12 in a general flattened region 25 between the ears 22 and 23 and in a longitudinally spaced, adjacent relationship relative to circumferential portion 19. The slot 24 has a proximal edge 26 that is adjacent to the circumferential lip portion 19 and an adjacent rearward distal edge 27.

The proximal edge 26 is elevated relative to the circumferential lip portion 18 by upwardly inclining a portion of the region 25 of the handle 12 that is adjacent to the proximal edge 26. The proximal edge 26 as so upraised extends straight (linearly), and this edge 26 is adapted for cracking the shell of an egg.

The handle 12 has a transverse downward curvature that increases as the handle distance increases from circumferential portion 19, as illustrated, for example, in FIGS. 3 and 5. This curvature is located in a handle longitudinal region that extends approximately between the location of the ears 22, 23 and a location adjacent the outer end 21. The handle 12 further has a medially depressed (when viewed from above), longitudinally extending, concave curvature that extends between and includes the distal edge 27 and the outer end 21. The terminal configuration of the handle 12 adjacent to the outer end 21 is thus such that terminal region of handle 12 is graspable between a curved forefinger and the thumb of one hand (not detailed). Consequently, the egg separator 10 is easily and conveniently hand holdable without appreciable interference with functional usage thereof.

The sidewalls 13 of cup 11 preferably have formed therein a radially (relative to the cup 11) outwardly extending distension region 28 that is located below and adjacent to the circumferential lip portion 19. The distension region 28 is thus in longitudinally spaced, adjacent relationship to the ears 22, 23. The interrelationship between the distension region 28 and the ears 22, 23 is such that the longitudinal spacing (relative to said handle 12) therebetween defines a channel 29 (see FIGS. 3 and 5, for example). The channel 29 has an open bottom and open opposite sides.

Thus, the interrelationship is such that the channel 29 of the egg separator 10 can be deposited (see FIG. 1) over the rim edge 31 of a vessel 32 (such as a mixing bowl or a measuring cup or the like) with the cup 11 being suspended over the vessel 32 interior and with the handle 12 being suspended outside the vessel 32. The transverse spacing between the ears 22 and 23 is such that the radius of curvature of the rim edge 31 causes no interference therewith. Thus, the egg separator 10 can be associated with vessels 32 or the like having a wide range of rim diameters, as desired.

To avoid interference between the rim edge 31 and the back side of the curved mid-region of handle 12 that commences adjacent to distal edge 27, a tab 33 and a tab 34, respectively, is preferably (and as shown) provided for each ear 22 and 23. Each tab 33 and 34 is conveniently and preferably interconnected both with a different lateral side of handle 12 and with an upper forward edge (relative to cup 11) of its respective associated ear 22 and 23. Thus, when the channel 29 is positioned over the rim edge 31 of vessel 32, the egg separator 10 rests on the bottom edge or shoulder of each tab 33 and 34.

The distension region 28 in the cup 12 abuts against an inside surface portion of the vessel 32 adjacent the rim edge 31 thereof. The transversely spaced ears 22 and 23 on the handle 14 cooperate with the distension region 28 in the cup 12 for attaching the egg separator 10 over the rim edge 31 of the vessel 32.

Once the egg separator 10 is attached to a mixing bowl, an egg shell can be cracked by striking the egg against the proximal edge 26 that projects upwardly from the handle 12. The proximal edge 26 does not penetrate deeply enough into the egg to break the yolk since the egg shell abuts against the adjacent raised upper surface region 25 of the handle 12, thereby stopping the travel of the egg before the yolk is damaged by the edge 26. The contents of the cracked egg are then conveniently dropped from the egg shell into the cup 11 wherein the whites of the egg drain through the slots 17 and 18 into the vessel 32. The egg yolk remains in the cup 12.

Preferably, the egg separator 10 is stamped and die formed from a metal sheet, such as a sheet comprised of an aluminum alloy, a stainless steel (preferred) or the like. As those skilled in the art will appreciate, an egg separator of the invention can also be formed of a molded plastic, such as a nylon, a polyester or an ABS resin.

It will be readily apparent from the foregoing detailed description of the invention and from the illustrations thereof that numerous variations and modifications may be effected without departing from the true spirit and scope of the novel concepts or principles of this invention.

What is claimed is:

1. A unitary egg separator comprising an apertured cup for separating an egg yolk from the associated egg white of a shelled egg deposited in said cup; and a laterally outwardly extending, downwardly arcuately curved handle extending from a lip region of said cup, said handle having an upstanding flange in said handle for cracking an egg shell.

2. The egg separator of claim 1 wherein said cup is configured as a spherical segment, and said cup apertures comprise a pair of symmetrically positioned, circumferentially elongated slots defined in said cup and located in upwardly spaced relationship to the bottom apex of said cup.

3. The egg separator of claim 2 wherein said handle is broad and said flange is located adjacent said lip region.

4. The egg separator of claim 1 wherein said flange includes an elongated upstanding edge.

5. The egg separator of claim 1 wherein said flange extends transversely across said handle is adjacent to said cup.

6. The egg separator of claim 1 which further includes a pair of transversely spaced ears, each one downwardly projecting from a different opposite side of said handle.

7. The egg separator of claim 6 wherein said cup has distension region extending outwardly and located adjacent to said ears and wherein said distension region cooperates with said ears for associating said egg separator with a vessel lip edge portion.

8. An egg separator comprising a cup having a bottom apex and elongated slots located in spaced relationship to said bottom apex; and a handle extending outwardly from said cup, said handle having a pair of ears downwardly projecting from opposite sides of said handle whereby said ears and said handle cooperate with said cup for associating said egg separator with a vessel edge;

said handle also having a transversely extending slot medially extending across said handle, and said slot having one opposed edge portion thereof upwardly raised relative to the other edge portion thereof whereby said one edge portion and said handle cooperate for cracking on egg shell impinged said one edge portion; and said handle further having a downward transverse curvature between about said ears and about the outer end of said handle.

9. The egg separator of claim 8 wherein said cup further includes distension region located adjacent said handle.

10. The egg separator of claim 8 wherein each said ear has a tab projecting therefrom towards said cup.

11. The egg separator of claim 10 wherein said ears define in combination with said distension region a transverse channel with an open bottom and open opposite sides, said channel being associatable with said vessel edge.

12. The egg separator of claim 8 wherein said handle further includes an upstanding flange projecting from said handle for cracking an egg shell.

13. The egg separator of claim 12 wherein said flange has an elongated edge.

14. The egg separator of claim 12 wherein said flange is adjacent to said cup.

15. An egg separator comprising:
   (a) an apertured cup for separating an egg yolk from egg white, said cup having generally spherically curved sidewalls and a circular lip;
   (b) a transversely broadened, longitudinally elongated handle that laterally outwardly extends from a circumferential portion of said lip to a handle outer end;
   (c) said handle having:
      (1) a pair of downwardly extending ears, each one being located on a different opposite lateral side portion of said handle and in equally longitudinally spaced relationship to said cup,
      (2) a transversely extending slot medially extending across said handle in the region of said ears, said slot having a proximal edge portion adjacent said lip portion and an adjacent rearward distal edge portion,
      (3) said proximal edge portion being elevated relative to said lip portion for cracking an egg shell impinged against said proximal edge portion.
   (d) said handle having a downward transverse curvature between said ears and said outer end,
   (e) said handle further having a medially depressed, longitudinally extending concave curvature between said distal edge portion and said handle outer end whereby said outer end is graspable between a curved forefinger and thumb of one hand;
   (f) said sidewalls including a radially outwardly extending distension region located below and adjacent to said lip portion; and
   (g) the interrelationship between said distension region and said ears being such that the longitudinal spacing therebetween relative to said handle defines a transverse channel with an open bottom and open opposite sides for nestable deposition of said egg separator over a vessel edge.

16. The egg separator of claim 15 wherein said cup apertures comprise a pair of elongated slots that are symmetrically positioned relative to each other and to a bottom apex of said cup.

17. The egg separator of claim 15 wherein each said ear includes a longitudinally forwardly extending relative to said cup downwardly projecting tab upon which said egg separator rests when said egg separator rests over said vessel edge.

* * * * *